United States Patent

Kozlay

[11] 3,878,653
[45] Apr. 22, 1975

[54] WORKPIECE AND TOOL HOLDER UNIT
[75] Inventor: Andrew J. Kozlay, Phillipsburg, N.J.
[73] Assignee: Ingersoll-Rand Co., Woodcliff, N.J.
[22] Filed: Jan. 4, 1974
[21] Appl. No.: 430,767

[52] U.S. Cl. ............ 51/216 A; 51/216 P; 51/219 R
[51] Int. Cl. .......................... B24b 24/06; B24b 9/00
[58] Field of Search .......... 51/102, 128, 173, 216 P, 51/216 A, 216 R, 219 R, 241 G

[56] References Cited
UNITED STATES PATENTS
2,909,011  10/1959  Hendricks et al.................... 51/102
3,164,932  1/1965   Morith............................. 51/102 X
3,698,140  10/1972  Steadman......................... 51/241 G
3,753,320  8/1973   Wurscher...................... 51/219 R X FOREIGN PATENTS OR APPLICATIONS
912  3/1875  United Kingdom.............. 51/219 R Primary Examiner—Al Lawrence Smith
Assistant Examiner—Marc R. Davidson
Attorney, Agent, or Firm—Bernard J. Murphy

[57] ABSTRACT

The unit comprises a one-piece guide and holder element, for slidably receiving a workpiece and for resiliently clasping a tool in order that the tool might operatively engage and process the workpiece. The guide comprises a tubular way, and the holder portion of the unit comprises an offset support or socket for enveloping and holding a tool (such as a grinder). Due to the angular or offset disposition of the tool support, a considerable portion of the tool traverses the tubular guide in order that most of the tool will be enclosed by the unit, and to enable the tool to operate on the furthermost side of the workpiece.

16 Claims, 3 Drawing Figures

WORKPIECE AND TOOL HOLDER UNIT

This invention pertains to a workpiece and tool holder unit for receiving a workpiece and for supporting a tool, for operation thereof on the workpiece, and in particular to such a unit particularly adapted for receiving threaded drill rods and for supporting a grinder to accomplish a chamfering of the ends of such drill rods.

It is well known in prior art to use threaded drill rods, in field drilling operations, in which the drill rod string is composed of a plurality of threaded rods joined together by means of a "bridge-type" coupling. The bridge-type coupling is an element internally threaded, from both ends, to a middle "bridge." The bridge is an annular shoulder which prevents an innermost end of a coupled drill rod from threading through to the opposite end of the coupling. New drill rods, as distributed from plant fabrication, have chamfering on the ends thereof. This is so that, on being joined in a bridge-type coupling, the chamfering will allow end portions of adjacent drill rods to span the coupling bridge and abut one another. As drill rod is impacted, it is essential that impacting forces be transmitted directly through abutting drill rod ends, rather than through the drill rod and coupling threads.

It will happen, of course, in field use, that drill rods will become fractured and broken. Heretofore, it has been necessary to have the larger portions of broken drill rods, which are salvageable materials, returned to the factory or a depot to have the broken ends thereof chamfered, and otherwise refinished, so that they might be used again in drill string coupling arrangements.

It is an object of this invention to obviate any requirement to ship salvageable drill rods from field operations for chamfering. It is also an object of this invention to provide a single workpiece and tool holder for use in the field to accomplish chamfering of broken and salvageable drill rods. It is another object of this invention to disclose a workpiece and tool holder unit comprising a single, one-piece guide and holder element; said guide and holder element having guide means for slidably receiving a workpiece, and support means for engaging a selected portion of a tool, and for holding the latter against movement relative to said unit and in working engagement with a workpiece; said guide means having a longitudinal axis; and said support means being formed on an angle relative to said axis, to hold a tool obliquely relative to said axis, in traverse of said guide means at said angle. A feature of this invention comprises a one-piece guide and holder element, for slidably receiving a workpiece and for resiliently clasping a tool in order that the tool might operatively engage and process the workpiece. The guide comprises a tubular way, and a holder portion of the unit comprises an offset support or socket for enveloping and holding a tool (such as a grinder). Due to the angular or offset disposition of the tool support, a considerable portion of the tool traverses the tubular guide in order that most of the tool will be enclosed by the unit, and to enable the tool to operate on the side of the workpiece which is furthermost from the tool.

Further objects and features of this invention will become more apparent by reference to the following description taken in conjunction with the accompanying figures in which.

Figure 1:
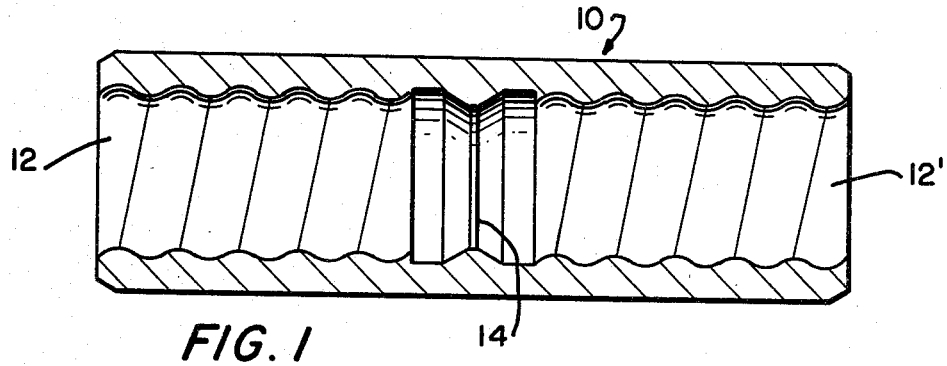
FIG. 1 is a cross-sectional view, in elevation of a typical bridge-type coupling used for coupling threaded rods.

As shown in FIG. 1, the typical bridge-type drill rod coupling 10 comprises a tubular element which is internally threaded through to the opposite ends 12 and 12', with an intermediate middle portion 14 thereof unthreaded. This middle portion 14, is the bridge, the same comprising an inwardly-projecting, annular shoulder. Drill rod which is coupled together, through coupling 10, is end-chamfered some 30 degrees (30°) or so, to enable abutment of interfacing drill rod ends.

As drill rod in use is rotated the coupling 10 transmits the rotary torque from one drill rod to the next. However, it is essential that impacting should not be carried by the threads of the coupling and drill rods. Rather, impact forces must be carried through the drill string directly from one rod to the next abutting one. If drill rod ends were not chamfered, they would terminate in coupling 10 with a gap therebetween due to the interposition of the bridge portion 14. For this reason, as it is necessary to refinish and chamfer ends of drill rods which are worth being salvaged, Applicant's invention provides a device, of which FIG. 2 is a preferred embodiment, usable in the the field for rod chamfering.

Figure 2:
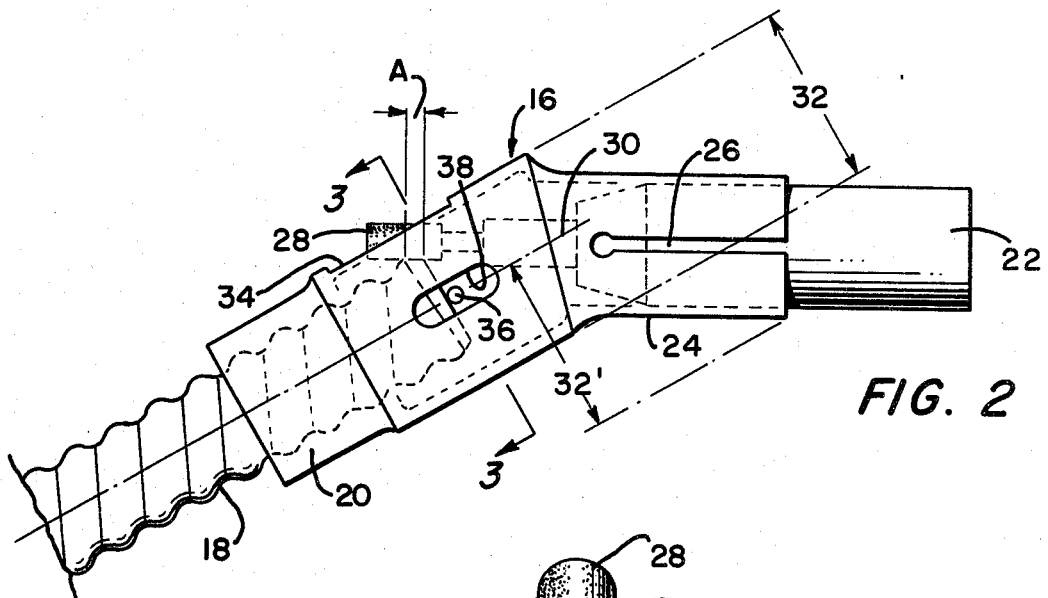
FIG. 2 is a side view, in elevation, of the novel workpiece and tool holder unit, according to an embodiment thereof.

FIG. 2 depicts an embodiment of a unit 16 having a salvageable drill rod 18 in slidable engagement with a workpiece guide 20, and a grinder tool 22 carried by an offset support 24 of the unit 16. The support is substantially tubular, and has an elongate, linear cut 26 formed in a wall thereof for frictionally clasping and holding the tool 22.

Tool 22, as is typical, has a cylindrical or drum shaped grinding bit 28. As depicted in FIG. 2, the tool is resiliently held in support 24 for an engagement of the bit 28 and the drill rod 18 on an intermediate portion A of the bit. The resilient clasp of the tool 22 by the support 24 insures an optimum use and expenditure of the bit 28; the tool 22 can be adjustably positioned, in the support 24, to cause bit portions adjacent to portion A, and end portions as well, to be used. Accordingly, the selective positioning possible for tools 22 lends itself to economical efficiency.

The unit 16 is designed to effect the optimum-angle chamber (approximately 30° of arc from the drill rod axis) without adjustment. Thus, the support 24 is formed on an angle, relative to the axis 30 of the guide 20. Additionally, the unit is designed to be as compact as possible. Accordingly, support 24 comprises means for holding tool 22 obliquely, relative axis 30, in traverse of the guide 20. With this arrangement, most of tool 22 is within the nominal diameter 32, as projected, of guide 20. In fact the support 24 is substantially confined within the projected diameter; the furthermost portion of the support 24 extends from axis 30 a distance 32' not more than the diameter 32.

Figure 3:
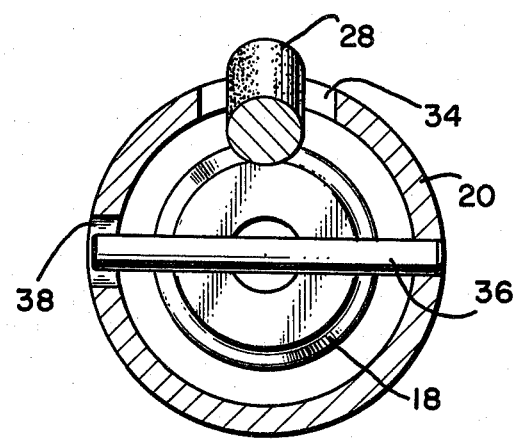
FIG. 3 is a cross-sectional view of the workpiece guide, taken along section 3—3 of FIG. 2, and enlarged.

This compact, well-integrated "packaging" of the unit 16 is made possible by the formation of an aperture 34 (FIGS. 2 and 3) in a wall of the guide 20, to admit the bit 28.

Without some limiting means, the tool 22 could grind the drill rod 18 indefinately—thus, more than necessary. To avoid this, a limit stop pin 36 is interposed for engaging the end of the rod 18. Pin 36 is fixed in, and extends radially from, an inner wall surface of guide 20.

In use, the unit 16 supports the tool 22 and slidably receives the to-be-processed rod 18 in guide 20. The tool is powered and either the unit 16 (and tool 22) are manually revolved about the rod 18 or, alternatively, the rod is rotated in the guide 20. When a full and uniform chamfer is completed, the rod is slidably withdrawn from the unit. In order that the condition of the rod, and the progress of its grinding, may be monitored, a second aperture 38 is provided in the guide 20.

While I have described my invention in connection with a specific embodiment thereof it is to be clearly understood that this is done only by way of example and not as a limitation to the scope of my invention as set forth in the objects thereof and in the appended claims.

I claim:

1. A workpiece and tool holder unit, comprising:
a single, one-piece guide and holder element;
said guide and holder element having guide means for slidably receiving a workpiece, and support means for engaging a selected portion of a tool, and for holding the latter against movement relative to said unit and in working engagement with a workpiece;
said guide means having a longitudinal axis; and
said support means being formed on an angle relative to said axis, in traverse of said guide means at said angle; wherein
said support means includes means for frictionally and resiliently clasping a tool at said angle in a plurality of selective and slidably adjusted positions.

2. A unit, according to claim 1, wherein:
said support means has an elongate axis; and
said guide means has an aperture formed therein, in alignment with said elongate axis, for receiving therewithin a working end of a tool.

3. A unit, according to claim 1, wherein:
said guide means defines a way, extending along said axis within which a workpiece may be oriented and slidably moved.

4. A unit, according to claim 1, wherein:
said guide means comprises a sleeve for slidably enclosing and orienting a portion of a workpiece.

5. A unit, according to claim 4, wherein:
said sleeve has an aperture formed therein for viewing of a workpiece therewithin.

6. A unit, according to claim 4, wherein:
said sleeve is circular in cross-section, and has a nominal outside diameter; and
said support means is substantially confined within an axial projection of said diameter.

7. A unit, according to claim 4, wherein:
said sleeve is circular in cross-section, and has a nominal outside diameter; and
a furthermost portion of said support means extends obliquely from said axis for a distance not greater than said diameter.

8. A workpiece and tool holder unit, comprising:
a single, one-piece guide and holder element;
said guide and holder element having guide means for slidably receiving a workpiece, said guide means having a longitudinal axis, and support means for engaging a selected portion of a tool, and for holding the latter against movement relative to said unit for working engagement with a workpiece in a plane transverse of said axis;
and
said support means being formed on an angle relative to said axis, to hold a tool obliquely, relative to said axis, in transverse of said guide means at said angle; and further including
limit stop means, fixed to one of said guide and support means and in said plane for obstructing a slidable movement of a workpiece received by said guide means beyond said plane.

9. A workpiece and tool holder unit, comprising:
a single, one-piece guide and holder element;
said guide and holder element having guide means for slidably receiving a workpiece, and support means for engaging a selected portion of a tool, and for holding the latter against movement relative to said unit and in working engagement with a workpiece;
said guide means having a longitudinal axis; and
said support means being formed on an angle relative to said axis, to hold a tool obliquely, relative to said axis, in traverse of said guide means at said angle; further including
limit stop means, fixed to one of said guide and support means for delimiting slidable movement of a workpiece received by said guide means to a given distance along said axis; and wherein
said limit stop means comprises an abutment carried by said guide means and disposed for impingement with a foremost end surface of a guide means-oriented workpiece.

10. A unit, according to claim 9, wherein:
said limit stop means comprises a pin extending from said guide means radially of said axis.

11. A workpiece and tool holder unit, comprising:
a single, one-piece guide and holder element;
said guide and holder element having guide means for slidably receiving a workpiece, and support means for engaging a selected portion of a tool, and for holding the latter against movement relative to said unit and in working engagement with a workpiece;
said guide means having a longitudinal axis; and
said support means being formed on an angle relative to said axis, to hold a tool obliquely, relative to said axis, in traverse of said guide means at said angle; wherein
said support means comprises tubular means for resiliently holding a tool; and
said tubular means comprises a short-length tube; and said tube has a linear cut, formed through a wall thereof, which causes said tube to be resiliently expansible and contractible for frictionally holding a tool.

12. In combination, a workpiece and tool holder unit, and a tool, comprising:
a single, one-piece guide and holder element,
said guide and holder element having guide means for slidably receiving a workpiece, and support means for engaging a selected portion of a tool, and for holding the latter against movement relative to said unit and in working engagement with a workpiece; and
a tool engagingly held by said support means;

said guide means being formed on an angle relative to said axis, causing said tool to be held obliquely, relative to said axis, in traverse of said guide means at said angle; wherein said support means includes means frictionally and resiliently clasping said tool at said angle in any one of a plurality of selective and slidably adjusted positions.

13. A combination, according to claim 12, wherein:
said support means has an elongate axis;
said guide means has an aperture formed therein in alignment with said elongate axis; and
said tool has a working end which is received within said aperture.

14. A combination, according to claim 12, wherein:
said guide means comprises a sleeve for slidably enclosing and orienting a portion of a workpiece.

15. A combination, according to claim 14, wherein:
said sleeve is circular in cross-section, and has a nominal outside diameter; and
said support means is substantially confined within an axial projection of said diameter.

16. A combination, according to claim 14, wherein:
said sleeve is circular in cross-section, and has a nominal outside diameter;
a furthermost portion of said support means extends obliquely from said axis for a radial distance not greater than said diameter; and
most of said tool is confined within an axial projection of said diameter.

* * * * *